United States Patent [19]

Nixon et al.

[11] 4,116,451
[45] Sep. 26, 1978

[54] SHAFT SEAL ASSEMBLY AND SEAL RING THEREFOR

[75] Inventors: Jeddy D. Nixon; Lawrence W. Matson, Jr., both of Houston, Tex.

[73] Assignee: Maurer Engineering, Inc., Houston, Tex.

[21] Appl. No.: 807,243

[22] Filed: Jun. 16, 1977

[51] Int. Cl.² .................. F16J 15/00; F16L 21/04
[52] U.S. Cl. .............................. 277/116; 277/124; 277/180; 277/235 R; 277/DIG. 6
[58] Field of Search ............ 277/233, 235 R, 235 A, 277/48, 235 B, 116, 180, 178, DIG. 6, 124

[56] References Cited

U.S. PATENT DOCUMENTS

| | | | |
|---|---|---|---|
| 1,924,555 | 8/1933 | Hubbard | 277/152 |
| 1,969,008 | 8/1934 | Hubbard | 277/48 |
| 2,200,212 | 5/1940 | Bohmer et al. | 277/180 |
| 2,525,747 | 10/1950 | Hess | 277/124 |
| 2,537,230 | 1/1951 | Mueller | 277/116 |
| 3,013,830 | 12/1961 | Milligan | 277/116 X |
| 3,381,968 | 5/1968 | Neilson | 277/235 X |
| 3,469,855 | 9/1969 | Enting | 277/235 R |
| 3,841,289 | 10/1974 | Meyers | 277/235 B X |

FOREIGN PATENT DOCUMENTS 2,503,671  8/1975  Fed. Rep. of Germany .......... 277/233

Primary Examiner—Robert S. Ward, Jr.
Attorney, Agent, or Firm—Jennings B. Thompson

[57] ABSTRACT

A seal is disclosed for use in high ambient temperatures. The seal includes a plurality of V-shaped seal rings having opposite convex and concave sides that are stacked or rested in the annular space provided between a shaft and a housing through which the shaft extends. Each seal ring includes an annular body of self-lubricating, low-friction graphite, which is a very good conductor of heat. The outer and inner edges of the annular body of graphite are moved into sealing engagement with the shaft and housing when the annular body is subjected to a differential pressure. A ring of spring metal that is V-shaped in cross-section is embedded in the annular body of graphite to support the annular body of low-friction material and hold it in position to form a seal between the shaft and the housing against the differential pressure exerted across the seal. One edge of the ring of spring metal engages the housing to provide a frictional force that resists relative movement between the seal ring and the housing and also to conduct heat from the seal directly through the spring metal into the housing in which the seal is located.

6 Claims, 3 Drawing Figures

SHAFT SEAL ASSEMBLY AND SEAL RING THEREFOR

This invention relates to seals generally and in particular to seals that are made up of a plurality of V-shaped seal rings positioned in an annular space between a shaft and housing to seal between the shaft and the housing.

The use of V-shaped seal rings for shaft seals is well known. Various kinds of seal rings have been provided for this purpose made out of a variety of materials. The life of any of these seals is directly proportional to the operating temperature. For example, one of the most difficult sealing problems is between the output shaft of a fluid powered downhole motor and the housing through which it extends. Two types of downhole motors are presently in operation. One is a turbodrill, which has stator blades on the housing and impeller blades on the shaft arranged so that drilling fluid pumped through the blading will rotate the shaft relative to the housing. At the end of the housing, where the shaft extends out of the housing, the fluid in the housing must be contained and this requires a seal between the output shaft of the turbine and the housing. The same is true of the other type fluid-powered downhole motor which operates on the Moyno pump principal.

In each case the downhole motor is operating immersed in an ambient fluid, i.e. drilling mud, that is heated by the work it does and also by the heat from the surrounding formations through which the hole is being drilled. Thus, it is difficult to carry away the heat generated between the rotating shaft and the seal located between the shaft and the lower portion of the housing. Therefore, the life of these seals has been one of the limiting factors on the length of time that these type tools can be operated, particularly where the drilling fluid or the depth of the hole make the ambient temperature extremely high.

It is an object of this invention to provide an improved seal for use in high-ambient temperatures, such as those encountered in the operation of a downhole fluid-powered motor.

It is a further object of this invention to provide a seal that has good heat conducting properties and which is arranged to improve the conduction of heat from the seal into the housing in which the seal is located to provide a better dissapation of the heat generated between the rotating shaft and the seal.

It is a further object to provide an improved seal for use in downhole motors that has a low coefficient of friction between the seal rings making up the seal and the rotating shaft and a relatively higher coefficient of friction between the seal rings and the housing in which the seal is located to tend to hold the rings from rotation relative to the housing and each other to a minimum.

These and other objects, advantages, and features of this invention will be apparent to those skilled in the art from a consideration of this specification including the attached drawings and appended claims.

In the Drawings

Figure 1:
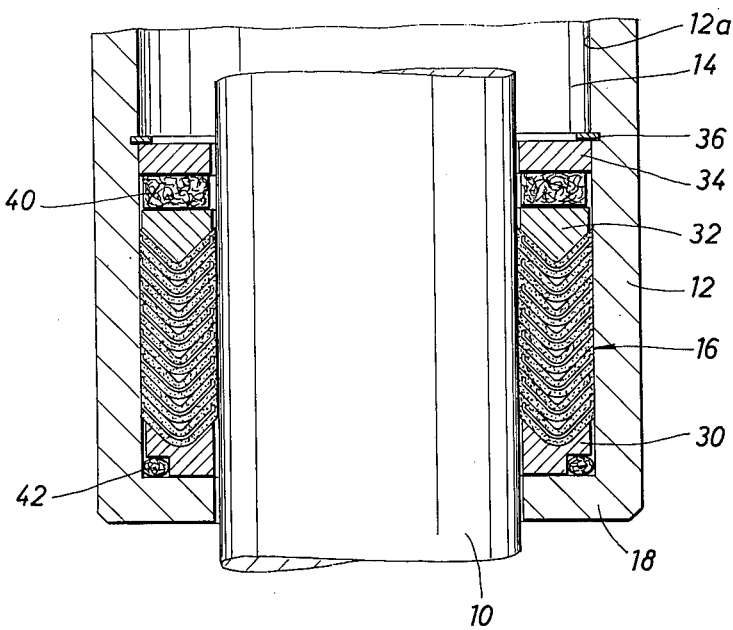
FIG. 1 is a cross-sectional view through the preferred embodiment of the seal of this invention showing the seal installed between an output shaft extending through a housing in which the shaft is located.

In FIG. 1, the preferred embodiment of the seal of this invention is shown in position to seal between a rotating shaft and a housing. In the drawing, shaft 10 is positioned in housing 12. The housing is spaced from the shaft to provide annular space 14 in which seal 16 is positioned. The end of housing 12 includes inwardly extending flange 18 that supports the seal in annular space 14. Bearings (not shown) are used to maintain the position of the shaft relative to the housing in the conventional manner.

Figure 2:
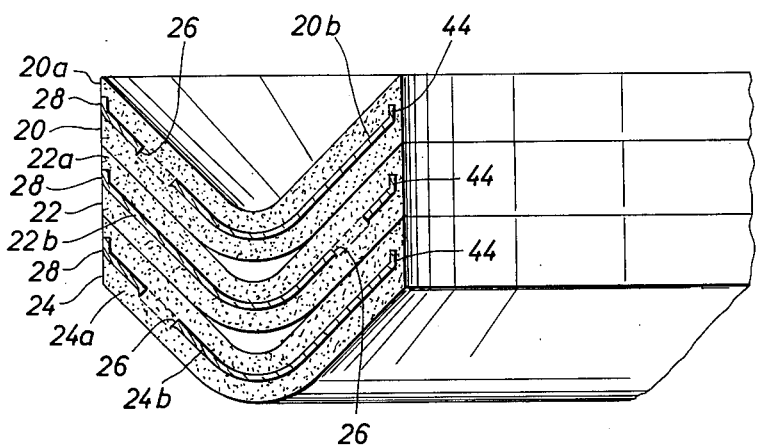
FIG. 2 is a cross-sectional view on an enlarged scale of the seal of FIG. 1.
Figure 3:
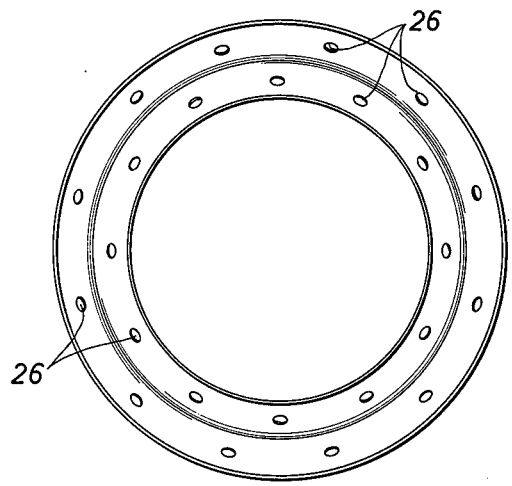
FIG. 3 is a plan view of the ring of spring metal that comprises one component of each seal ring of the seal.

Seal 16 includes a plurality of seal rings that are V-shaped in cross section with opposite convex and concave sides for stacking with the concave sides facing in the same direction. In FIG. 2, three seal rings 20, 22, and 24 are shown on an enlarged scale in cross section. The seal rings include annular bodies 20a, 22a, and 24a of graphite, which is a self-lubricating, low-friction material having a high coefficient of thermal conductivity. One such material that can be used for this part of the seal ring is graphite sold in ribbons under the trademark "GRAFOIL" which can be formed and molded or pressed into the desired shape by applying a compressive force to the material. Embedded in the annular bodies of graphite are rings 20b, 22b and 24b which are V-shaped in cross section as shown and made of spring material, such as beryllium copper. These rings of spring steel are provided to support the graphite bodies and hold them in position to form a seal between the shaft and the housing Each ring of spring metal is provided with a plurality of holes 26 through which a portion of the body of graphite to anchor the rings in the body of graphite to prevent relative rotation between the two.

In addition, in the preferred embodiment of this invention, the outer edge of each ring is provided with a flange, such as flanges 28, as shown in FIG. 2, that are flush with the outer edges of the bodies of graphite engage the inner surface 12a of housing 12. Thus, when each seal ring is subjected to a differential pressure forcing the inner and outer edges of the body of graphite against the shaft and inner surface of the housing respectively, flange 28 on the ring of spring metal will be forced into firm engagement with the inner surface of the housing and provide a frictional force tending to resist relative rotation between the seal ring and the housing. This is an important feature of the seal of this invention because it is important that the seal rings be held to the extent possible against relative rotation with the housing and with each other. In this manner, substantially all relative rotation will occur between the shaft and the inner surfaces of the seal ring. Here the ring of spring metal is spaced from the edge of the graphite.

Another advantage of this arrangement is that the heat generated between the rotating shaft and the inner surfaces of the seal ring will be conducted through the spring metal rings to the housing and transmitted directly from the metal rings into the housing. The graphite is also a good conductor of heat, and, therefore, it will also serve to conduct heat from the relatively moving surfaces to the housing.

As explained above, each seal ring has opposite convex and concave sides so that they can be stacked or nested as shown in FIGS. 1 and 2 in the annular space 14 between housing 12 and shaft 10. The outermost ring is supported by annular member 30 having a V-shaped groove as shown to support the members. On the opposite end of the stack of seal rings is annular ring 32 which also is V-shaped to extend into the V-shaped upper seal ring to hold it in position to move into sealing engagement when subjected to a differential pressure. Annular ring 34 and retaining snap ring 36, which extends into a groove provided therefore in housing 12 hold the seal in position against longitudinal movement along the shaft away from flange 18 on the housing. Positioned between ring 32 and 34 is an annular ring of resilient material, such as wire mesh, to provide a spring force to hold the various parts of the seal in position. This ring is slightly compressed when the snap ring is installed. Ring 40 also allows the seal to adjust as required longitudinally, when it is alternately subjected to differential pressures. O ring 42 is positioned to provide a static seal between housing 12 and lower support ring 30. This is in addition to the seal provided by the outer edges of the seal rings in engagement with the inner surface of the housing.

In the embodiment shown, the rings of spring metal are also provided with flanges on the inner edges thereof. These flanges 44 help collect heat generated between the rotating shaft and the inner edges of the seal rings to carry the heat through the spring metal members into the housing.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of this invention without departing from the scope thereof, it is to be understood that all matter herein set forth or shown in the accompanying drawings is to be interpreted as illustrative and not in a limiting sense.

The invention having been described, what is claimed is:

1. A seal for sealing the annular space between a rotating shaft and a housing comprising a plurality of seal rings that are V-shaped in cross-section with opposite convex and concave sides for stacking with the concave sides facing in the same direction, each seal ring including an annular body of self-lubricating, low-friction graphite having high thermal conductivity, said annular body being V-shaped in cross-section having outer and inner edges for moving into sealing engagement with a shaft and housing when subjected to a differential pressure and a ring of spring metal that is V-shaped in cross-section and embedded in the annular body of graphite to support the annular body of graphite in position to provide a seal between the shaft and the housing.

2. The seal of claim 1 in which the outer edge of the ring of spring metal engages the housing to provide a frictional force between the ring and the housing resisting relative movement between the seal ring and the housing.

3. The seal of claim 1 in which the ring of spring metal is provided with perforations through which portions of the annular body of graphite extend to keep the body of graphite from rotating relative to the ring of spring metal.

4. A V-shaped seal ring for sealing between a shaft and a housing against a differential pressure in one direction comprising an annular body of self-lubricating, low-friction graphite having high thermal conductivity, said annular body being V-shaped in cross-section having outer and inner edges for moving into sealing engagement with a shaft and housing when subjected to a differential pressure and a ring of spring metal that is V-shaped in cross-section and embedded in the annular body of graphite to support the annular body in position to provide a seal between the shaft and the housing.

5. The seal ring of claim 4 in which the ring of spring metal is positioned for its outer edge to contact the housing to increase the friction between the outer edge of the seal ring and the housing that resists relative rotation between the seal ring and the housing.

6. The seal ring of claim 5 in which the ring of spring metal is provided with an annular flange on its inner edge to increase the volume of metal adjacent the inner edge of the seal ring for collecting heat to be carried to the housing through the ring.

* * * * *